No. 783,346. PATENTED FEB. 21, 1905.
E. WITZENMANN.
CHANDELIER.
APPLICATION FILED MAR. 24, 1904.
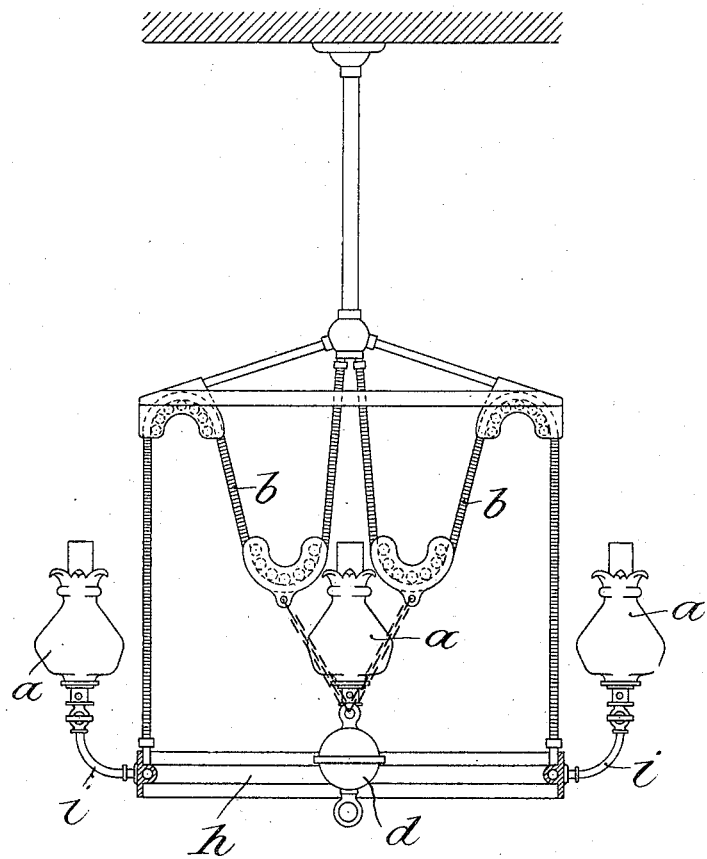
Witnesses.
D. E. Harrison
E. C. Duffy
Inventor.
Emil Witzenmann,
by O. E. Duffy & Son
Attys.

No. 783,346. Patented February 21, 1905.

UNITED STATES PATENT OFFICE.

EMIL WITZENMANN, OF PFORZHEIM, GERMANY.

CHANDELIER.

SPECIFICATION forming part of Letters Patent No. 783,346, dated February 21, 1905.

Application filed March 24, 1904. Serial No. 199,854.

*To all whom it may concern:*

Be it known that I, EMIL WITZENMANN, manufacturer, a subject of the grand duke of Baden, residing at 48 Holzgartenstrasse, Pforzheim, Baden, German Empire, have invented new and useful Improvements in Chandeliers, of which the following is a specification.

My invention relates to an improvement on the chandelier described in my patent application, Serial No. 173,340, filed September 15, 1903.

The invention is illustrated in the accompanying drawing, in which the figure shows a vertical section of a gasolier.

The lamps $a$, rendered adjustable in height by means of the common counterweight $d$, instead of being secured as hitherto directly to the metallic spiral hose $b$ are connected to a pipe $h$, suspended by the metallic hose $b$. The connection between the lamps and the pipe $h$ is effected by means of the branch pipes $i$, which feed the luminant to the burners. The lamps can in this manner be disposed as in an ordinary chandelier, and their number is independent of the number of metallic hose-pipes $b$.

The pipe $h$ may be of round, (hoop,) square, triangular, or other form, as rendered desirable by the conditions in each particular case.

My improved chandelier may be constructed for gas or electricity, as desired. In the latter case the hose $b$, pipe $h$, and branch pipes $i$ serve as conduits for the electric conductors.

Having thus described my invention, what I claim as new, and desire to secure by Letters Patent, is—

A chandelier comprising a stationary stem, pulleys supported by the same, flexible pipes branching from the stem and passing over said pulleys, a pipe supported by the said flexible pipes, pipes branching from the said supported pipe, lamps carried by the said branch pipes, weight-pulleys resting on the flexible pipes between the said stem and suspension-pulleys, and a counterweight hung on the weight-pulleys, substantially as described.

In witness whereof I have hereunto signed my name, this 10th day of March, 1904, in the presence of two subscribing witnesses.

EMIL WITZENMANN.

Witnesses:
B. WITZENMANN,
ERNST ENTENMAN.